[12] United States Patent  
Nanjo et al.

(10) Patent No.: US 7,477,314 B2  
(45) Date of Patent: Jan. 13, 2009

(54) EXPOSURE CONTROL METHOD AND APPARATUS FOR AN IMAGE PICKUP APPARATUS

(75) Inventors: Yusuke Nanjo, Kanagawa (JP); Yuichi Nakano, Chiba (JP); Akira Kumano, Kanagawa (JP); Masatoshi Yamagiwa, Tokyo (JP)

(73) Assignee: Sony Corporation (JP)

( * ) Notice: Subject to any disclaimer, the term of this patent is extended or adjusted under 35 U.S.C. 154(b) by 321 days.

(21) Appl. No.: 10/740,759

(22) Filed: Dec. 22, 2003

(65) Prior Publication Data

US 2004/0130653 A1 Jul. 8, 2004

Related U.S. Application Data

(63) Continuation of application No. 09/357,892, filed on Jul. 21, 1999, now Pat. No. 6,771,315.

(30) Foreign Application Priority Data

Jul. 31, 1998 (JP) ............................. P10-217235  
Jun. 29, 1999 (JP) ............................. P11-183776

(51) Int. Cl.
*H04N 5/238* (2006.01)  
*H04N 5/225* (2006.01)  
*G03B 7/00* (2006.01)  
*G02B 5/22* (2006.01)

(52) U.S. Cl. .................. 348/363; 348/360; 348/364; 396/241; 359/889

(58) Field of Classification Search .................. 348/361, 348/360, 362–364; 396/209, 241; 359/888, 359/889

See application file for complete search history.

(56) References Cited

U.S. PATENT DOCUMENTS 4,291,959 A 9/1981 Easterly (Continued)

FOREIGN PATENT DOCUMENTS

JP 50-113435 9/1975

(Continued)

OTHER PUBLICATIONS

Japanese Office Action dated May 22, 2008 for corresponding Japanese Application No. 11-189776.

*Primary Examiner*—Nhan T Tran  
(74) *Attorney, Agent, or Firm*—Rader Fishman & Grauer PLLC; Ronald P. Kananen

(57) ABSTRACT

The invention concerns with an exposure control mechanism for use in an image pickup apparatus in which a diaphragm aperture formed by a plurality of diaphragm blades moving straightforward in opposite directions is covered by an ND filter, and intends to prevent deterioration of image quality caused by diffraction even in an image pickup device having a small picture size and a short pixel pitch. The image pickup apparatus comprises an exposure control mechanism for adjusting the quantity of light flux entering a shooting lens system. The exposure control mechanism comprises a diaphragm made up of diaphragm blades movable on a plane perpendicular to an optical axis in opposite directions to define a diaphragm aperture, and an ND filter made up of at least two ND filter elements having different transmittances. When the diaphragm blades are displaced from an aperture open state in a direction to restrict the quantity of transmitting light, an aperture area is restricted by the diaphragm blades from the open state to a predetermined aperture area, and thereafter the ND filter is advanced into the diaphragm aperture successively from one of the ND filter elements having the highest transmittance while the predetermined aperture area is maintained.

5 Claims, 16 Drawing Sheets

U.S. PATENT DOCUMENTS

| | | | |
|---|---|---|---|
| 4,827,348 A | 5/1989 | Ernest et al. | |
| 5,293,542 A | 3/1994 | Ise et al. | |
| 5,479,298 A | 12/1995 | Yamagi et al. | |
| 5,483,280 A * | 1/1996 | Takahashi et al. | 348/363 |
| 6,078,442 A * | 6/2000 | Tada et al. | 359/888 |
| 6,340,252 B1 | 1/2002 | Kawano | |
| 6,720,995 B1 * | 4/2004 | Kaneda et al. | 348/363 |

FOREIGN PATENT DOCUMENTS

| | | | |
|---|---|---|---|
| JP | 05-055132 | | 3/1993 |
| JP | 05-281592 | | 10/1993 |
| JP | 08-006105 | | 1/1996 |
| JP | 08-248472 | | 9/1996 |
| JP | 10-096971 | | 4/1998 |
| JP | 10-133254 | | 5/1998 |
| JP | 10-210487 | * | 8/1998 |

* cited by examiner

FIG. 3
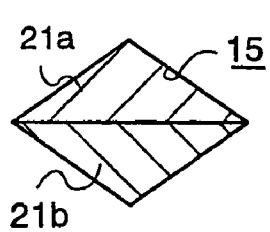
(M)
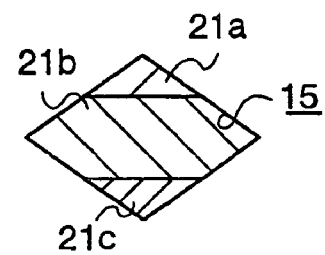
(N)
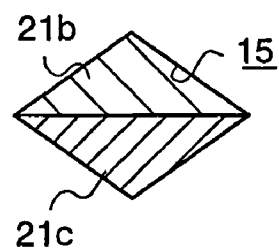
(O)
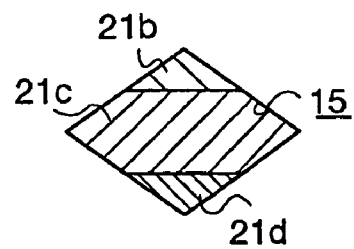
(P)
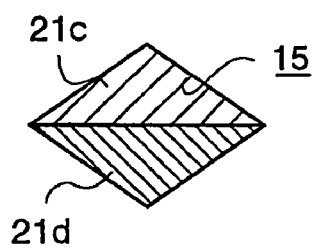
(Q)
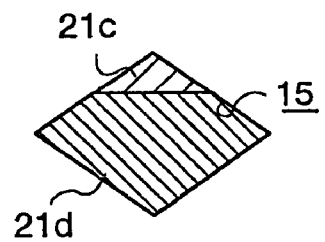
(R)
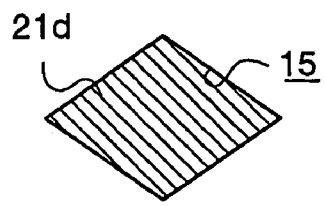
(S')
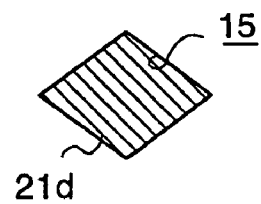
(T)

$$\text{ERROR AMOUNT} = \frac{\text{TARGET VALUE}}{\text{DETECTED VALUE OF LUMINANCE SIGNAL}} \text{ [dB]} \quad \text{(FORMULA 1)}$$

$$\text{TOTAL AMOUNT TO BE CONTROLLED} = \text{TOTAL AMOUNT CONTROLLED IN LAST CYCLE} + \text{ERROR AMOUNT [dB]} \quad \text{(FORMULA 2)}$$

FIG. 15
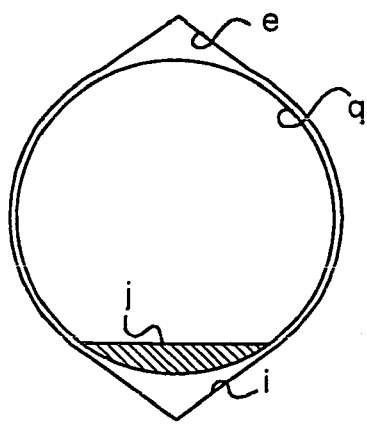
(a)
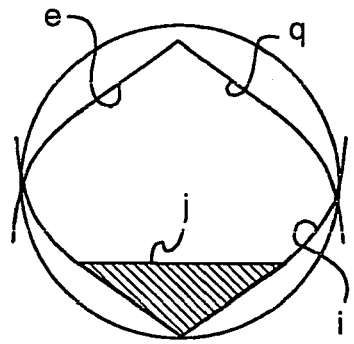
(b)
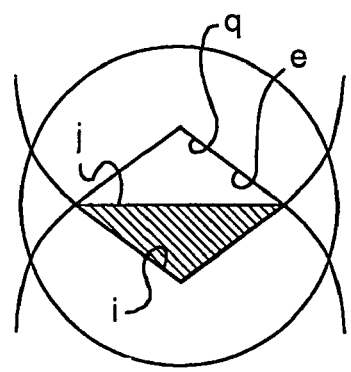
(c)
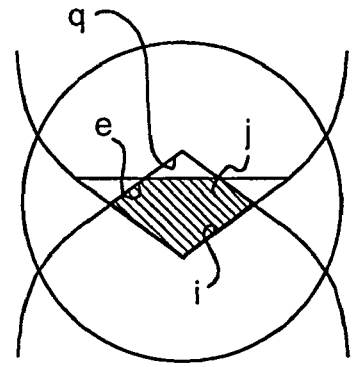
(d)
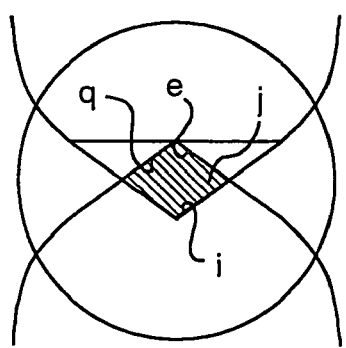
(e)
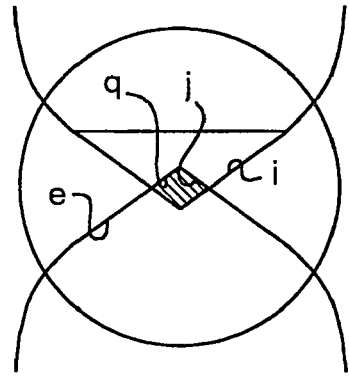
(f)

EXPOSURE CONTROL METHOD AND APPARATUS FOR AN IMAGE PICKUP APPARATUS

RELATED APPLICATION

This application is a continuation of application Ser. No. 09/357,892, filed on Jul. 21, 1999, which is now U.S. Pat. No. 6,771,315.

BACKGROUND OF THE INVENTION

1. Field of the Invention

The present invention relates to an exposure control mechanism for use in an image pickup apparatus in which a diaphragm aperture formed by a plurality of diaphragm blades moving straightforward in opposite directions is covered by an ND filter, and more particularly to the technique of suppressing deterioration of image quality caused by diffraction even in an image pickup device having a small picture size and a short pixel pitch.

2. Description of the Related Art

In image pickup apparatuses such as video cameras, an exposure control mechanism comprising two diaphragm blades moved on a straight line in opposite directions for reduction of size, weight and cost have become more commonly used instead of the so-called "iris diaphragm" wherein a plurality of diaphragm blades are rotated about an optical axis to adjust the aperture size.

However, if the aperture size becomes too small when a subject is bright, there occur such problems that image quality is deteriorated due to diffraction and smudges are brought into an image due to an increase of the depth of focus.

In view of those problems, a mechanism has been proposed in which an ND filter is affixed to one of diaphragm blades in such a manner as to project into a cutout which is formed in the diaphragm blade to define the aperture size, so that the aperture is avoided from becoming extremely small.

FIG. 14 shows one example of an exposure control mechanism for use in conventional image pickup apparatuses.

An exposure control mechanism a comprises two diaphragm blades b, c and a drive means d for driving the diaphragm blades b, c.

One (front) diaphragm blade b has a cutout e formed at a lower end for defining the aperture size. Two guided slits f, f extending vertically are formed in the diaphragm blade b at a position near a right edge thereof in vertically spaced relation. Also, a guided slit g extending vertically is formed in the diaphragm blade b at a position near a left edge thereof.

It is to be noted that directions U, D, L, R, F and B indicated by arrows in the drawings, including FIG. 14, represent the upward, downward, leftward, rightward, forward and backward directions, respectively.

A connecting slot h being elongate horizontally is formed in the diaphragm blade b at a position just above the upper right guided slit f.

Guide pins provided on a housing (not shown), which has formed therein a light passing hole, are slidably engaged in the guided slits f, f and g, respectively. The diaphragm blade b is thereby supported by the housing in a vertically slidable manner.

The other (rear) diaphragm blade c has a cutout i formed at an upper end for defining the aperture size, and an ND filter j is attached to the diaphragm blade c so as to cover a lower end area of the aperture size defining cutout i. Two guided slits k, k extending vertically are formed in the diaphragm blade c at a position near a left edge thereof in vertically spaced relation.

Also, a guided slit 1 extending vertically is formed in the diaphragm blade b at a position near a right edge thereof. Incidentally, the ND filter j has transmittance of 10%.

Furthermore, a connecting slot m being elongate horizontally is formed in the diaphragm blade c at a position just above the upper left guided slit k.

Guide pins provided on the housing (not shown) are slidably engaged in the guided slits k, k and l, respectively. The diaphragm blade c is thereby supported by the housing in a vertically slidable manner.

The drive means d comprises a drive motor n attached to an upper portion of the housing (not shown), and an operating arm o fixed to a rotary shaft of the drive motor n.

The operating arm o extends substantially in the right-and-left direction, and is fixed at its central portion to the rotary shaft of the drive motor n. Also, connecting pins p, p are projected respectively from right and left ends of the operating arm o.

The connecting pin p at the right end of the operating arm o is slidably engaged in the connecting slot h of the diaphragm blade b, and the connecting pin p at the left end of the operating arm o is slidably engaged in the connecting slot m of the diaphragm blade c.

Accordingly, when the operating arm o is rotated by energizing the drive motor n, the connecting pins p, p are moved in opposite directions, whereupon the diaphragm blades b, c coupled to the connecting pins p, p are moved vertically in opposite directions. As a result, a diaphragm aperture q defined by the aperture size defining cutouts e, i of the two diaphragm blades b, c is changed.

FIGS. 15a to 15f show a manner in which the ND filter j covers the diaphragm aperture q when the diaphragm aperture q is gradually narrowed from an open state (FIG. 15a) to a small aperture state (FIG. 15f) by moving the diaphragm blades b, c of the exposure control mechanism a.

FIG. 16 shows values of an MTF (modulation transfer function) depending on various sizes of the diaphragm aperture q indicated in FIGS. 15a to 15f. Here, the MTF value means a diffraction limit value of the white MTF value determined by calculating, based on wave optics, the capability in the vertical direction (line image in the horizontal direction) at spatial frequency corresponding to the TV resolution of about 260 lines. Also, the dimension of the ND filter j is decided so that the diaphragm aperture q has a size corresponding to F 5.6 at the moment when the diaphragm aperture q is entirely covered by the ND filter j (see FIG. 15e). The MTF value at that moment is 0.73.

Specifically, the MTF value means a diffraction limit value of the white MTF value determined by calculating, based on wave optics, the capability in the vertical direction (line image in the horizontal direction) that is evaluated by the fact that the effect of diffraction appears significantly in the states of FIGS. 15a to 15f, in view of spatial frequency of 48 lines/mm corresponding to the TV resolution of about 260 lines, i.e., frequency representing image quality in a motion video camera comprising an image pickup device wherein the picture diagonal length is 4.5 mm, a pixel pitch is about 5 µm, and the number of effective pixels is 380,000.

Accordingly, deterioration of image quality is regarded as being allowed if the MTF value is not less than a predetermined value. The MTF value =0.65 has been employed, by way of example, as an allowable limit value in the past. Note that the MTF value is not an absolute value, but a relative value used for determining whether deterioration of image quality is in the allowable range.

In the case of conventional image pickup devices in which the picture diagonal length is 4.5 mm, as shown by a solid line in FIG. 16, when the diaphragm blades b, c are moved to gradually narrow the diaphragm aperture q, the MTF value is also gradually reduced, and takes a minimum value in the state shown in FIG. 16d, i.e., at the aperture size d. Then, the MTF value increases again and takes a maximum value in the state shown in FIG. 16e, i.e., at the aperture size e. Thereafter, the MTF value decreases again.

The reason why the MTF value takes a minimum value at the aperture size d is that a vacant space area surrounded by the diaphragm blade b and the ND filter j serves as like a small aperture to develop diffraction, and image quality is deteriorated in an intermediate aperture state.

When the diaphragm blades b, c are further moved to gradually narrow the diaphragm aperture q, the MTF value increases again and takes a maximum value at the aperture size e. This is because until the diaphragm aperture q changes from the aperture size d to the aperture size e at which the diaphragm aperture q is completely covered by the ND filter j, the effect of diffraction is gradually reduced so that the MTF value increases. When the diaphragm aperture q is further narrowed from the aperture size e, the MTF value decreases again due to the effect of diffraction.

Taking into account such changes of the MTF value, it has been customary that the transmittance of the ND filter j is designed to keep the MTF value not less than 0.65 in all the sates from the open aperture a to the small aperture f.

Recently, in image pickup apparatuses, there has been a tendency to reduce the picture size of an image pickup device. A reduction in the picture size of the image pickup device decreases the pixel pitch and increases the effect of diffraction, thus making it hard to obtain satisfactory image quality. While conventional image pickup devices had a picture diagonal length of 4.5 mm, for example, the picture diagonal length has been recently reduced to 2.25 mm. The spatial frequency corresponding to the TV resolution of about 260 lines is 48 lines/mm for the picture diagonal length of 4.5 mm, and 96 lines/mm for the picture diagonal length of 2.25 mm. If the picture diagonal length of an image pickup device is changed to 4.5 mm with the pixel pitch remained unchanged, this case corresponds to frequency representing image quality in a still-video camera comprising 1.5 millions pixels.

When an image pickup device having a picture diagonal length of 2.25 mm is employed in combination with the conventional exposure control mechanism a, the spatial frequency is doubled and therefore the effect of diffraction is remarkably increased, thus giving rise to a problem that image quality is deteriorated.

More specifically, a broken line in FIG. 16 shows a curve of the MTF value resulted when the conventional exposure control mechanism a is combined with such a small image pickup device. As seen, the MTF value is reduced down below 0.65 in a state in which the diaphragm aperture q is narrowed from the aperture size b to some extent. This means that the above combination is not practicable. In other words, the conventional exposure control mechanism a has a problem of being not adaptable for downsizing of the image pickup device.

SUMMARY OF THE INVENTION

In consideration of the problems as set forth above, the present invention concerns with an exposure control mechanism for use in an image pickup apparatus in which a diaphragm aperture formed by a plurality of diaphragm blades moving straightforward in opposite directions is covered by an ND filter, and intends to prevent deterioration of image quality caused by diffraction even in an image pickup device having a small picture size and a short pixel pitch.

To achieve the above object, the present invention provides an image pickup-apparatus comprising an exposure control mechanism for adjusting the quantity of light flux entering a shooting lens system, the exposure control mechanism comprising a diaphragm made up of diaphragm blades movable on a plane perpendicular to an optical axis in opposite directions to define a diaphragm aperture, and an ND filter made up of at least two ND filter elements having different transmittances, wherein when the diaphragm blades are displaced from an aperture open state in a direction to restrict the quantity of transmitting light, an aperture area is restricted by the diaphragm blades from the open state to a predetermined aperture area, and thereafter the ND filter is advanced into the diaphragm aperture successively from one of the ND filter elements having the highest transmittance while the predetermined aperture area is maintained.

In the image pickup apparatus of the present invention, the exposure control mechanism includes the ND filter made up of at least two ND filter elements having different transmittances, and the ND filter is advanced into the diaphragm aperture successively from one of the ND filter elements having the highest transmittance. Therefore, an image pickup device having a small picture size and a short pixel pitch can be employed with less deterioration of image quality.

BRIEF DESCRIPTION OF THE DRAWINGS

FIGS. 2A, 2S and 2L are schematic views showing shapes of a diaphragm aperture of the exposure control mechanism, in which FIG. 2A represents an open aperture state, FIG. 2S represents a state having a predetermined aperture size, and FIG. 2L represents an intermediate aperture state;

FIGS. 3M to 3S' are schematic views representing states in which filter elements of an ND filter are advanced to the diaphragm aperture successively in the descending order from one having the highest transmittance in the intermediate aperture state of the exposure control mechanism, and FIG. 3T is a schematic view representing a state in which the diaphragm aperture is narrowed from the state of FIG. 3S';

FIGS. 15a to 15f are schematic views showing shapes of a diaphragm aperture successively from an open aperture state (FIG. 15a) to a small aperture state (FIG. 15f).

DESCRIPTION OF THE PREFERRED EMBODIMENTS

Details of an image pickup apparatus of the present invention will be described below in connection with embodiments shown in the accompanying drawings.

FIGS. 1 to 4 show a first embodiment of the image pickup apparatus of the present invention. An exposure control mechanism 1 for use in the image pickup apparatus according to the first embodiment differs from the above-described conventional exposure control mechanism a in that an ND filter holding member for holding an ND filter and a moving means for moving the ND filter holding member are provided. Also, the exposure control mechanism 1 for use in the image pickup apparatus according to the first embodiment is applied to an image pickup device which has a picture diagonal length of 2.25 mm (spatial frequency of 96 lines/mm).

Figure 1:
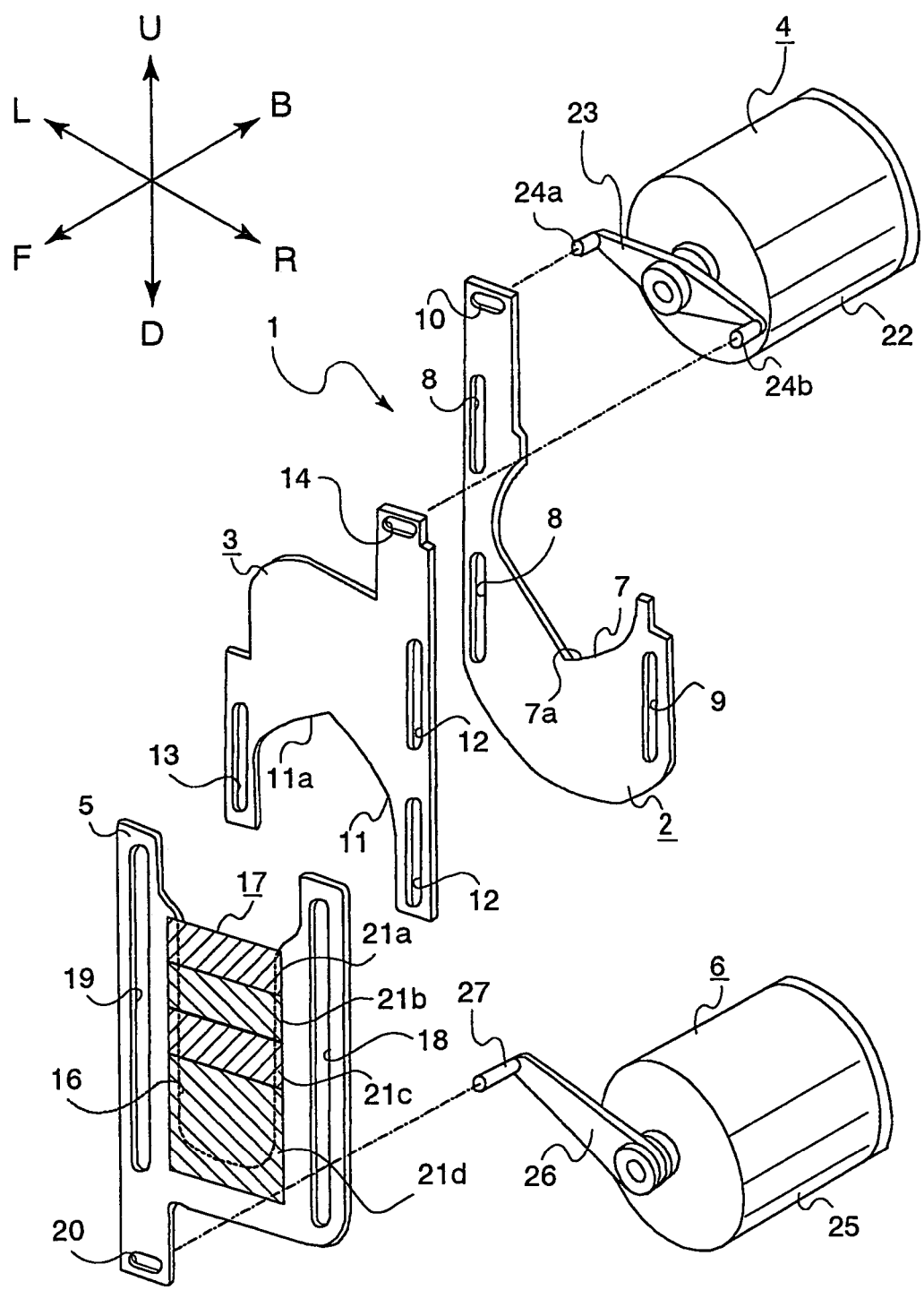
FIG. 1 is an exploded perspective view of an exposure control mechanism, showing a first embodiment of the present invention along with FIGS. 2 and 3.
Figure 2:
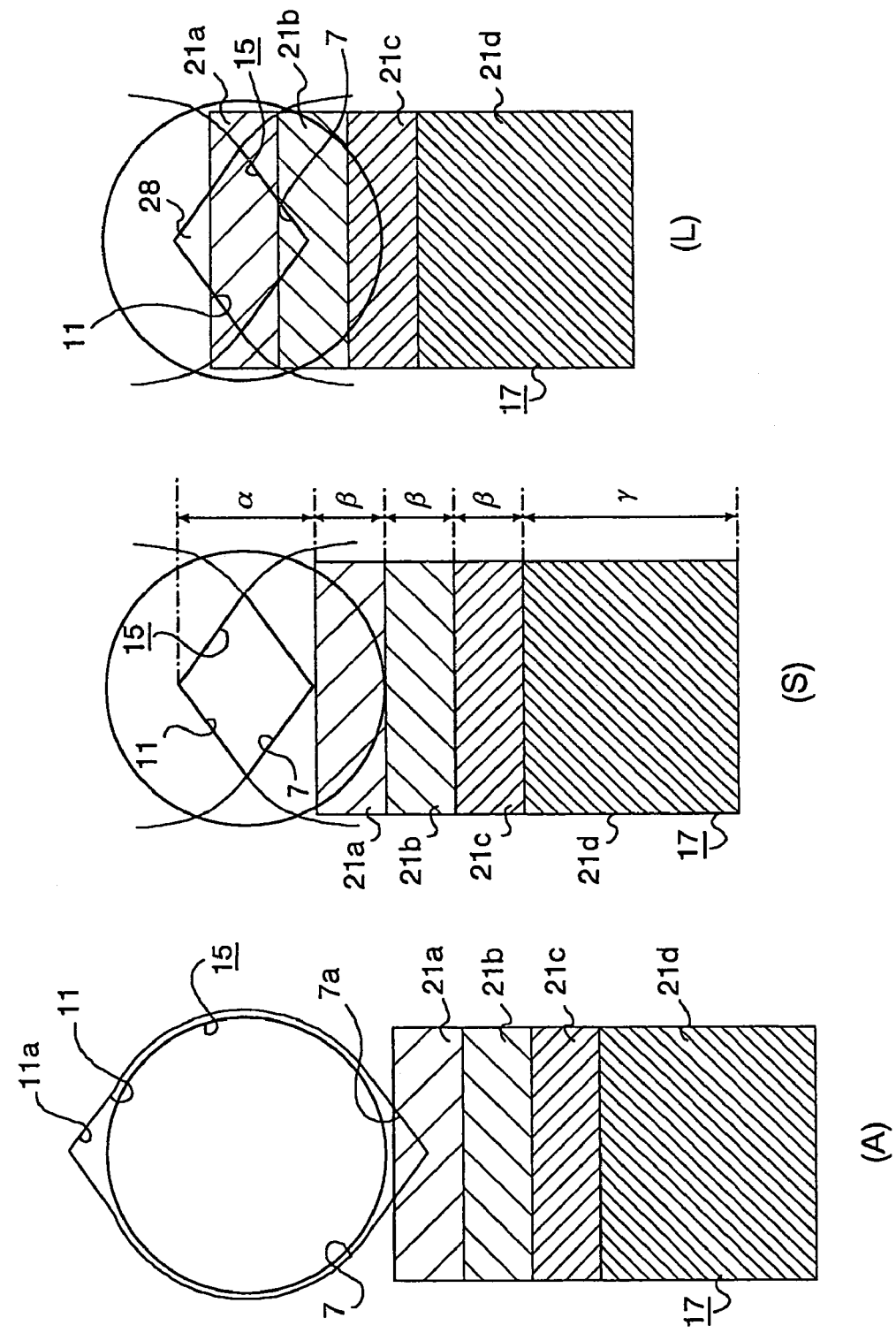

The exposure control mechanism 1 comprises two diaphragm blades 2, 3 disposed to be vertically movable in opposite directions, a diaphragm blade driving mechanism 4 for moving the diaphragm blades 2, 3, an ND filter holding member 5 to which an ND filter (described later) is attached, and an ND filter driving mechanism 6 for moving the ND filter holding member 5, etc. Note that directions U, D, L, R, F and B indicated by arrows in the drawings, including FIG. 1, represent the upward, downward, leftward, rightward, forward and backward directions, respectively.

The diaphragm blades 2, 3 and the ND filter holding member 5 are each formed of a resin film having relatively high stiffness. One diaphragm blade 3 is positioned between the other diaphragm blade 2 and the ND filter holding member 5. These three components are arranged in a shooting lens system such that the diaphragm blade 2 is positioned on the object side and the ND filter holding member 5 is positioned on the image side.

The diaphragm blades 2, 3 and the ND filter holding member 5 are, though now shown, vertically slidably disposed in a box-like rectangular housing which is flat in the back-and-forth direction and is elongate in the vertical direction. Circular light passing holes are formed in walls of the housing.

The diaphragm blade 2 is substantially J-shaped as viewed from the back side, and a substantially semicircular large cutout 7 for defining the aperture size is formed at an upper end of a lower portion of the diaphragm blade 2. A lower end area 7a of the aperture size defining cutout 7 is formed to have a substantially triangular shape.

Two guided slits 8, 8 extending vertically are formed in the diaphragm blade 2 at a position near a left edge thereof in vertically spaced relation. Also, a guided slit 9 extending vertically is formed in the diaphragm blade 2 at a position near a right edge thereof. A connecting slot 10 being elongate horizontally is formed in the diaphragm blade 2 at a position just above the upper left guided slit 8.

Two support pins provided on the left side of the housing (not shown) are slidably engaged in the left guided slits 8, 8, and a support pin provided on the housing at a lower right position is slidably engaged in the right guided slit 9, respectively. The diaphragm blade 2 is thereby supported by the housing in a vertically movable manner.

A substantially semicircular cutout 11 for defining the aperture size is formed at a lower end of the diaphragm blade 3 positioned between the diaphragm blade 2 and the ND filter holding member 5 in the direction of an optical axis. An upper end area 11a of the aperture size defining cutout 11 is formed to have a substantially triangular shape.

Two guided slits 12, 12 extending vertically are formed in the diaphragm blade 3 at a position near a right edge thereof in vertically spaced relation. Also, a guided slit 13 extending vertically is formed in the diaphragm blade 3 at a position near a left edge thereof. A connecting slot 14 being elongate horizontally is formed in the diaphragm blade 3 at a position just above the upper right guided slit 12.

Two support pins provided on the right side of the housing (not shown) are slidably engaged in the right guided slits 12, 12, and a support pin provided on the housing at a lower left position is slidably engaged in the left guided slit 13, respectively. The diaphragm blade 3 is thereby supported by the housing in a vertically movable manner.

Further, the diaphragm blades 2, 3 are vertically movable in opposite directions, and an opening defined by the aperture size defining cutouts 7, 11 overlapping with each other serves as a diaphragm aperture 15. The size of the diaphragm aperture 15 is, as described later, changed by the diaphragm blade driving mechanism 4.

The ND filter holding member 5 has a cutout 16 formed in its central portion to have a substantially U-shape being open upward as viewed from the front. The cutout 16 has a horizontal width substantially equal to or slightly greater than the horizontal width of the aperture size defining cutouts 7, 11, and an ND filter 17 is disposed in the cutout 16 so as to cover the same. Also, in the ND filter holding member 5, a guided slit 18 is formed at a position near a right edge of the ND filter 17, and a guided slit 19 is formed at a position near a left edge of the ND filter 17. A connecting slot 20 being elongate horizontally is formed in the ND filter holding member 5 at a position just below the left guided slit 19.

Two support pins provided on the right side of the housing (not shown) are slidably engaged in the right guided slit 18, and two support pins provided on the left side of the housing are slidably engaged in the left guided slit 19, respectively. The ND filter holding member 5 is thereby supported by the housing in a vertically movable manner.

The ND filter 17 is made up of four filter elements 21a, 21b, 21c and 21d which have different transmittances and are arranged side by side in the vertical direction. The filter element 21a positioned at the top has the highest transmittance, and the transmittances of the other filter elements are gradually reduced toward the bottom one. The filter elements 21a, 21b, 21c and 21d of the ND filter 17 are formed by depositing thin films on one transparent plate material so as to provide different transmittances by vapor deposition or any other suitable means.

More specifically, the filter element 21a positioned at the top (hereinafter referred to as a "first filter element") has transmittance of 40%, the filter element 21b positioned at the second level from the top (hereinafter referred to as a "second filter element") has transmittance of 16%, the filter element 21c positioned at the third level from the top (hereinafter referred to as a "third filter element") has transmittance of 6.3%, and the filter element 21d positioned at the bottom. (hereinafter referred to as a "fourth filter element") has transmittance of 2.5.

Further, the sizes of the filter elements in the vertical direction (i.e., the vertical widths of the filter elements) are selected as follows. The upper three filter elements 21a, 21b and 21c are formed to have the same vertical width β and to satisfy the relationship of β=α/2 wherein a is the vertical size of the diaphragm aperture 15 that is resulted when the aperture is adjusted to a predetermined size. Also, the relationship between a vertical width γ of the fourth filter element 21d and the vertical width β of the other filter elements 21a, 21b and 21c is set to satisfy at least γ≧2β. In this first embodiment, γ=3β is selected.

A manner of deciding the predetermined aperture size α and the transmittances of the filter elements 21a, 21b, 21c and 21d will now be described. It is to be noted that the exposure control mechanism 1 according to the present invention intends, when applied to an image pickup device having a picture diagonal length of 2.25 mm, to maintain image quality comparable to that obtained when the exposure control mechanism a described above in connection with the related art is applied to an image pickup device having a picture diagonal length of 4.5 mm, and therefore to keep the MTF value not less than 0.65 for that purpose.

Figure 16:
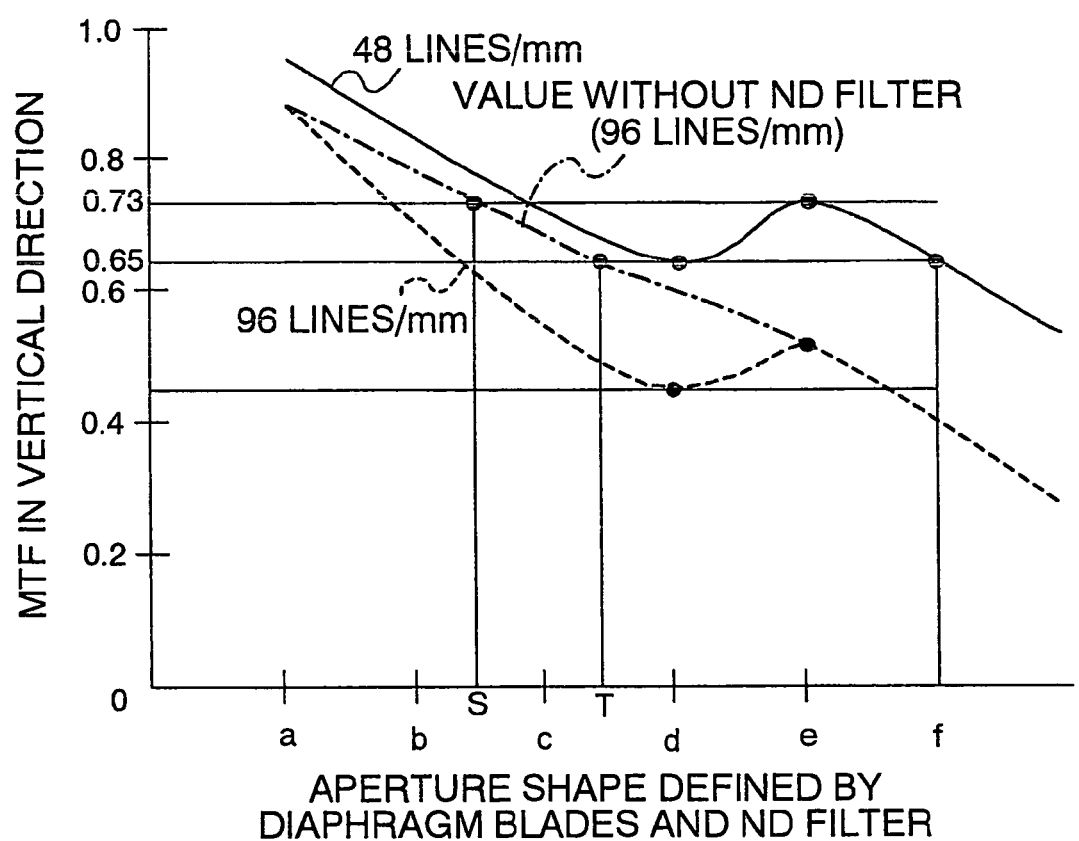
FIG. 16 is a graph showing the relationship between an MTF value and a shape of the diaphragm aperture.

First, for an image pickup device having a picture diagonal length of 2.25 mm, the MTF value depending on the aperture size, resulted when the diaphragm aperture 15 is gradually narrowed without the ND filter, is measured and drawn in the form of a graph (indicated by a one-dot-chain line in FIG. 16). Then, an aperture size (see FIG. 2S), at which the MTF value takes 0.73, is determined. This aperture size gives the aforesaid predetermined aperture size α.

The MTF value at the predetermined aperture size α corresponds to the maximum value in the graph of the MTF value obtained by the exposure control mechanism a described above in connection with the related art (i.e., the graph indicated by the solid line in FIG. 16). The reason for deciding the predetermined aperture size α in such a way is to attain such a result that a graph of the MTF value obtained using the ND filter 17 by the exposure control mechanism 1 according to this embodiment is varied within the range between the above MTF value (0.73) and the MTF value (0.65) at a lower allowable limit.

Next, the transmittance of the fourth filter element 21d is decided so that a transmitted light quantity ratio resulted from covering, by the ND filter element having the lowest transmittance (i.e., the fourth filter element 21d), the entirety of the aperture size (corresponding to a state of FIG. 3T) at which the MTF value takes 0.65 when the diaphragm aperture 15 is further gradually narrowed without the ND filter, becomes equal to the transmitted light quantity ratio resulted by the conventional exposure control mechanism a when the diaphragm aperture is minimized (i.e., in the state of FIG. 15f with the ND filter j having transmittance of 10%). In the case of the exposure control mechanism 1 according to this embodiment, the transmittance of the fourth filter element 21d thus decided is 2.5%. Here, the term "transmitted light quantity ratio" means a ratio of the quantity of transmitted light when the aperture is open., to the quantity of transmitted light when the aperture is narrowed to a certain size.

The transmittances of the other filter elements 21a, 21b and 21c are only required to satisfy such a relation that the transmittances of one filter element is higher than the transmittances of the filter elements positioned below the one. In view of the above, the transmittances of the other filter elements are designed to have the above-mentioned values.

Additionally, when taking a measure for suppressing diffraction occurred in the intermediate aperture state, it is effective to avoid a vacant space area 28 (see FIG. 2L), which is surrounded by the aperture size defining cutout 11 of the diaphragm blade 3 and the first filter element 21a, from functioning as a small aperture. To this end, the filter element having the highest transmittance (i.e., the first filter element 21a) is preferably designed to have transmittance as high as possible.

The diaphragm blade driving mechanism 4 of the exposure control mechanism 1 comprises a motor 22 disposed in an upper portion of the exposure control mechanism 1, a rotating arm 23 driven by the motor 22, etc. The rotating arm 23 is attached to a rotary shaft of the motor 22.

The rotating arm 23 is fixed at its central portion to the rotary shaft of the motor 22, and small connecting pins 24a, 24b are projected forward respectively from left and right ends of the rotating arm 23. The connecting pins 24a, 24b are positioned such that the distances from the rotary shaft of the motor 22 to the connecting pins 24a, 24b are equal to each other.

The connecting pin 24a at the left end of the rotating arm 23 is slidably engaged in the connecting slot 10 of the diaphragm blade 2, and the connecting pin 24b at the right end of the rotating arm 23 is slidably engaged in the connecting slot 14 of the diaphragm blade 3.

Accordingly, when the rotating arm 23 is rotated, the connecting pins 24a, 24b are displaced vertically in opposite directions, whereupon the diaphragm blades 2, 3 are moved vertically in opposite directions. At this time, the diaphragm blades 2, 3 are moved vertically in opposite directions through the same displacements, i.e., at the same speed.

With the vertical movements of the diaphragm blades 2, 3 in opposite directions, the size of the opening defined by the aperture size defining cutouts 7, 11 overlapping with each other, i.e., the size of the diaphragm aperture 15, is changed as follows. The diaphragm aperture 15 is minimized (corresponding to the small aperture state) when the diaphragm blade 2 is positioned at an upper end of the movable range thereof and the diaphragm blade 3 is positioned at a lower end of the movable range thereof, and the diaphragm aperture 15 is maximized (corresponding to the open aperture state) when the diaphragm blade 2 is positioned at a lower end of the movable range thereof and the diaphragm blade 3 is positioned at an upper end of the movable range thereof. Incidentally, the diaphragm aperture 15 in the open aperture state is not defined by the aperture size defining cutouts 7, 11 overlapping with each other, but has the same size as that of the light passing hole formed in the housing (not shown) of the exposure control mechanism 1.

The ND filter driving mechanism 6 of the exposure control mechanism 1 comprises a motor 25 disposed in a lower portion of the exposure control mechanism 1, a rotating arm 26 driven by the motor 25, etc. The rotating arm 26 is attached to a rotary shaft of the motor 25.

The rotating arm 26 is fixed at its one base end to the rotary shaft of the motor 25, and a small connecting pin 27 is projected forward from the other distal end of the rotating arm 26.

The connecting pin 27 is slidably engaged in the connecting slot 20 of the ND filter holding member 5. Accordingly, when the rotating arm 26 is rotated, the ND filter holding member 5 is vertically moved.

The diaphragm blade driving mechanism 4 and the ND filter driving mechanism 6 are driven, as described below, for forming the diaphragm aperture 15 and deciding the position of the ND filter 17 relative to the diaphragm aperture 15.

First, the diaphragm blade driving mechanism 4 is driven to narrow the diaphragm aperture 15 from the open aperture state (FIG. 2A) to the state (see FIG. 2S) having the predetermined aperture size α. The diaphragm aperture 15 is then held in the predetermined aperture state.

Next, the ND filter driving mechanism 6 is driven to advance the ND filter 17 into the diaphragm aperture 15 having the predetermined aperture size α, starting from the filter element having the highest transmittance (i.e., the first filter element 21a) in a successive manner (see FIGS. 2S, 2L, and 3M to 3T). The advance of the ND filter 17 into the diaphragm aperture 15 is started immediately before the diaphragm aperture 15 takes the predetermined aperture size α. The reason is to produce the so-called dead zone in which the quantity of passing light is not changed regardless of driving of the exposure control mechanism 1. The presence of the dead zone makes it easy to carry out various control of an optical system in an apparatus including the exposure control mechanism 1, e.g., a camera.

Subsequently, the diaphragm blade driving mechanism 4 is driven again to further narrow the diaphragm aperture 15 from the state (see FIG. 3S') in which the diaphragm aperture 15 having the predetermined aperture size α is covered by the fourth filter element 21d only.

Figure 4:
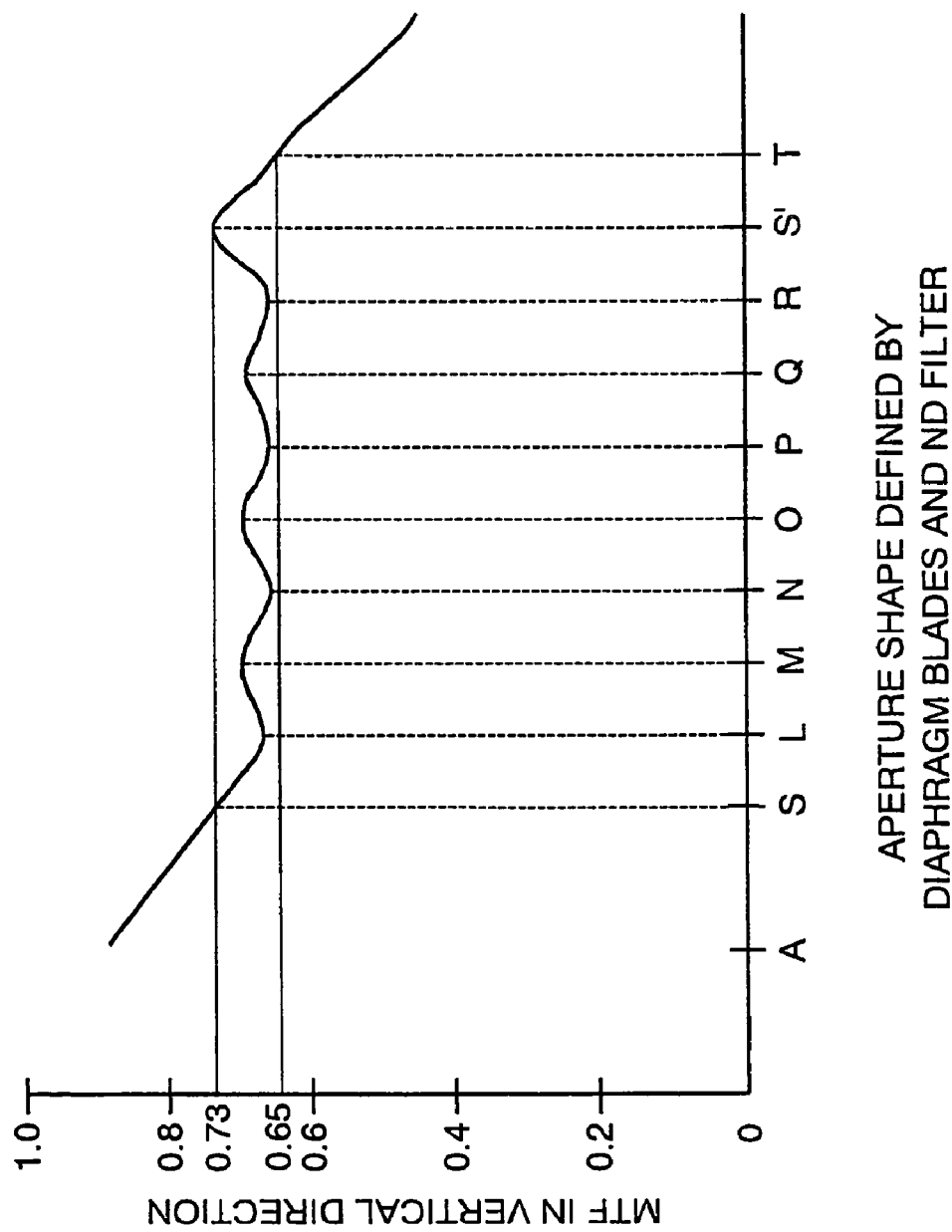
FIG. 4 is a graph showing the relationship between an MTF value and an aperture shape defined by diaphragm blades and the ND filter of the exposure control mechanism.

FIG. 4 is a graph showing the relationship between the respective states, which depend on changes in size of the diaphragm aperture 15 and changes in movement of the ND filter at the predetermined aperture size, and MTF values corresponding to the respective states.

More specifically, as the diaphragm aperture 15 is narrowed from the open aperture state A to the predetermined aperture size α(see FIG. 2S), the MTF value is gradually reduced and takes 0.73 in the state S. Then, as the ND filter 17 is advanced into the diaphragm aperture 15 having the predetermined aperture size α, the MTF value is further reduced and takes a minimum value in the state (see FIG. 2L) in which the ND filter 17 is advanced to occupy a lower ¾ area of the diaphragm aperture 15. At this time, the MTF value is slightly higher than 0.65. The state of FIG. 2L corresponds to the state in which the vertical width β of the first filter element 21a is entirely positioned in the diaphragm aperture 15 and an upper ½ area (β/2) of the second filter element 21b is positioned in the diaphragm aperture 15. In the state of FIG. 2L, the vacant space area 28 is in the form of a small flat triangle. However, since a difference in transmittance between the vacant space area 28 and the first filter element 21a is smaller than conventional, deterioration of image quality caused by diffraction is alleviated.

The reason why the MTF value takes a minimum value when the diaphragm aperture 15 is in the state of FIG. 2L is that the vacant space area 28 surrounded by the aperture size defining cutout 11 of the diaphragm blade 3 and the first filter element 21a serves as like a small aperture to develop diffraction, and image quality is somewhat deteriorated.

When the ND filter 17 is further raised to such an extent that the entire vertical width β of the first filter element 21a and the entire vertical width β of the second filter-element 21b are both positioned in the diaphragm aperture 15, the MTF value takes a maximum value which is slightly smaller than 0.73 (see FIG. 3M).

In this way, as the ND filter 17 is raised, two or three of the filter elements 21a, 21b, 21c and 21d are positioned in the diaphragm aperture 15, and the MTF value takes a minimum value when a small aperture is formed between the filter element 21 having the highest transmittance (i.e., the filter element 21 positioned at the top in the diaphragm aperture 15) or the vacant space area 28 and the aperture size defining cutout 11 of the diaphragm blade 3 (see FIGS. 2L, 3N, 3P and 3R). Also, between one small aperture state and the next small aperture state, the diaphragm aperture 15 is in a state other than the small aperture state, and therefore the MTF value increases and takes a maximum value (see FIGS. 3M, 3O and 3Q).

When the diaphragm blade driving mechanism 4 is driven again from the state (see FIG. 3S') in which the diaphragm aperture 15 having the predetermined aperture size α is covered by the fourth filter element 21d only, the MTF value is gradually reduced, and the diaphragm blade driving mechanism 4 is stopped when reaching the state (see FIG. 3T) in which the MTF value takes 0.65.

Thus, an any of the states ranging from the state (see FIG. 2A) in which the diaphragm aperture 15 of the exposure control mechanism 1 is fully open to the state (see FIG. 3S') in which the predetermined aperture size α is covered by the fourth filter element 21d only, as well as the state (see FIG. 3T) in which the diaphragm aperture 15 of the exposure control mechanism 1 is further narrowed from the predetermined aperture size α, the MTF value takes a value not less than 0.65, i.e., an allowable value.

In the exposure control mechanism 1 described above, since the ND filter 17 is advanced into the diaphragm aperture 15 while the diaphragm aperture 15 is fixedly held at the predetermined aperture size α, various control of the optical system can be performed with ease.

Additionally, in the image pickup apparatus of the present invention, the exposure control mechanism is not limited to the illustrated one wherein the ND filter is advanced into the diaphragm aperture while the diaphragm aperture is fixedly held at the predetermined aperture size. For example, the diaphragm aperture may be gradually narrowed while causing the ND filter to be advanced into the diaphragm aperture at a higher speed than the narrowing speed of the diaphragm aperture.

An algorithm for control of the exposure control mechanism 1 according to the first embodiment will be described below with reference to FIGS. 4 to 8.

Figure 5:
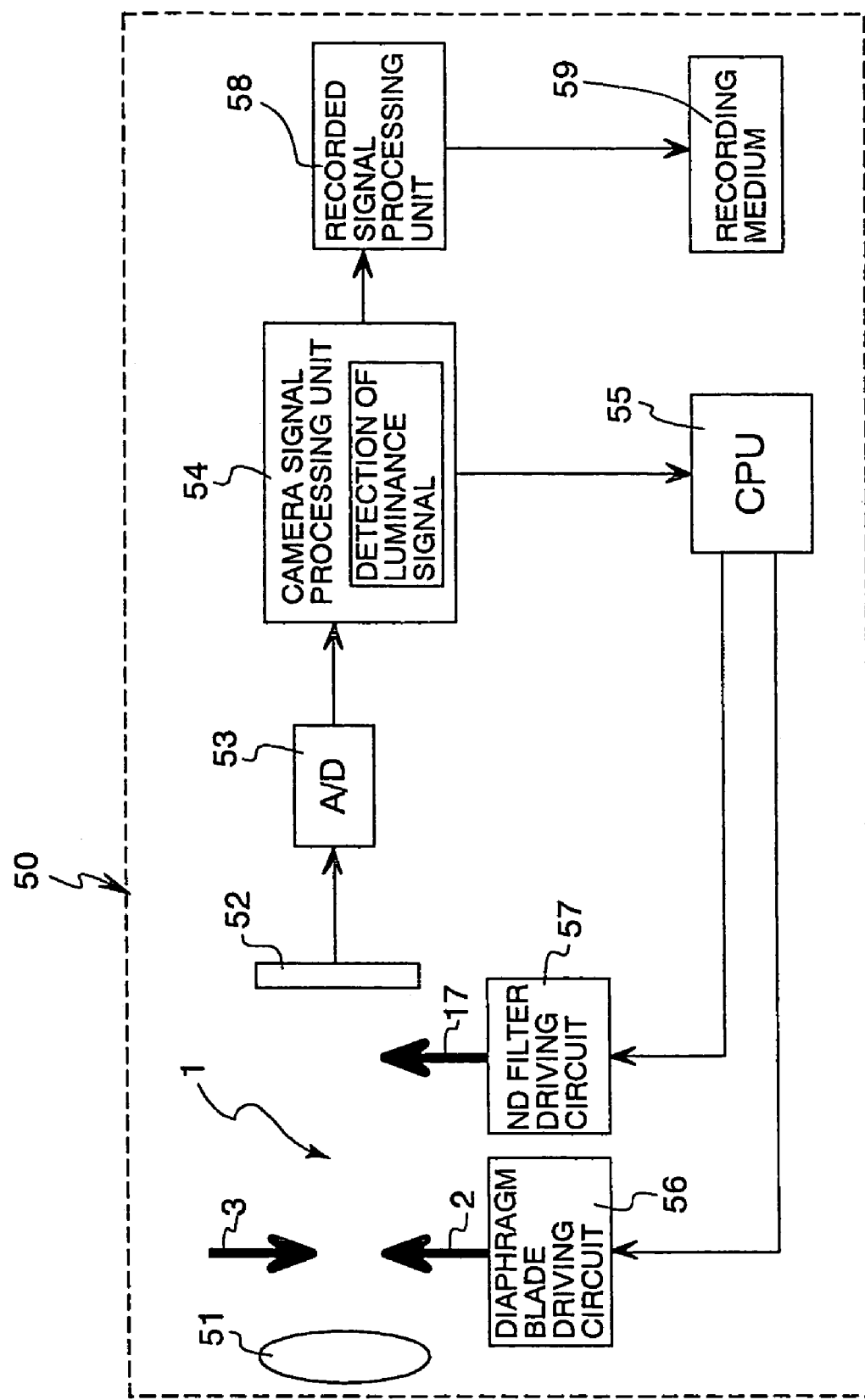
FIG. 5 is a block diagram of the image pickup apparatus for explaining an algorithm for controlling the exposure control mechanism in the first embodiment of the image pickup apparatus of the present invention along with FIGS. 6 to 8.

In an image pickup apparatus 50, as shown in FIG. 5, a subject image is focused on an image pickup device (CCD) 52 through a shooting lens system 51. Between the shooting lens system 51 and the CCD 52, there are disposed the diaphragm blade 2, the diaphragm blade 3 and the ND filter 17 which constitute the exposure control mechanism 1. These components cooperatively adjust the quantity of light introduced to the CCD 52.

A video signal converted into an electric signal by the CCD 52 is further converted into a digital signal by an A/D converter 53. The digital signal is sent to a camera signal processing unit 54 in which a luminance signal component of the video signal is detected to determine the brightness of the subject.

A value of the luminance signal detected in the camera signal processing unit 54 is sent to a CPU 55 which calculates amounts to be controlled by the diaphragm blades 2, 3 and the ND filter 17 of the exposure control mechanism 1. Control signals representing the amounts to be controlled are sent to a diaphragm blade driving circuit 56 and an ND filter driving circuit 57 which operate the diaphragm blade driving mechanism 4 and the ND filter driving mechanism 6, respectively, thereby adjusting the quantity of exposure light.

Also, the video signal supplied to the camera signal processing unit 54 is recorded in a recording medium 59 through a recorded signal processing unit 58. The recording medium 59 may be, e.g., a film-like recording medium such as a silver salt film, a tape-like recording medium such as a video tape, a disk-like recording medium such as a floppy disk, an optical disk, a magneto-optical disk and a hard disk, or a semiconductor recording medium such as a detachable or stationary solid state memory.

A process executed in the CPU 55 for calculating the amounts to be controlled by the diaphragm blades 2, 3 and the ND filter 17 will be described below.

Figure 6:
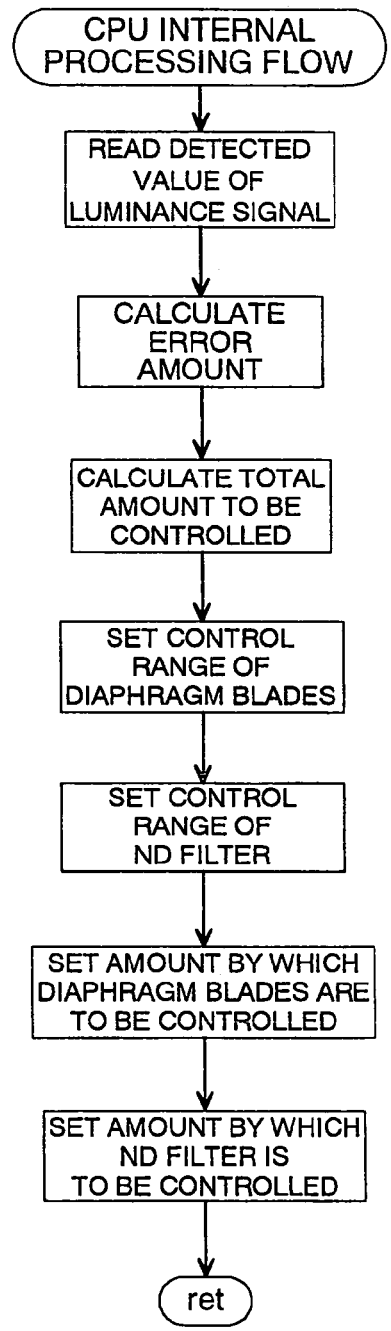
FIG. 6 is a flowchart showing a process of calculating an amount to be controlled for exposure control in a CPU.

As shown in FIG. 6, the value of the luminance signal detected in the camera signal processing unit 54 is first read. The CPU 55 previously stores a target value as a reference for the brightness of the subject, and an error amount is given by a ratio of the target value to the detected value (see Formula 1 in FIG. 6). The error amount represents an error amount regarding the amounts by which the diaphragm blades 2, 3 and the ND filter 17 are controlled at present. Therefore, an amount 60 to be controlled in the next cycle by the diaphragm blades 2, 3 and the ND filter 17 is expressed by Formula 2 in FIG. 6.

Then, a control range of the diaphragm blades 2, 3 is set. In other words, this step decides how far the diaphragm aperture 15 is maximally narrowed from a reference state in which the diaphragm blades 2, 3 are open (see a range A in FIG. 7). The range A is decided based on MTF data of the shooting lens system 50 so that image quality is not deteriorated within the range A.

Subsequently, a control range of the ND filter 17 (see a range B in FIG. 7) is decided. This step is to decide the position at which advance of the ND filter 17 is started.

The amount 60 to be controlled in the next cycle is then distributed between the diaphragm blades 2, 3 and the ND filter 17. A distributing manner in this step will be described with reference to FIGS. 7 and 8.

Figure 7:
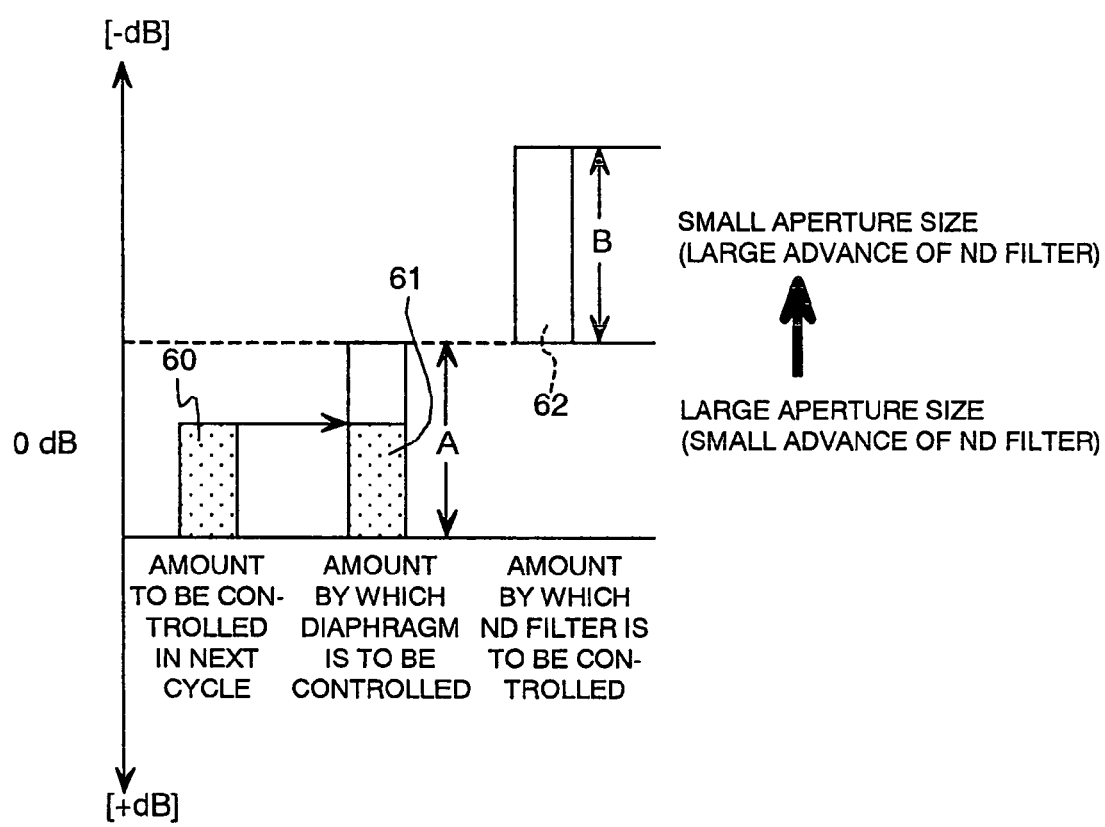
FIG. 7 shows a manner of distributing an amount to be controlled in the next cycle when the amount to be controlled in the next cycle is within the control range of a diaphragm.
Figure 8:
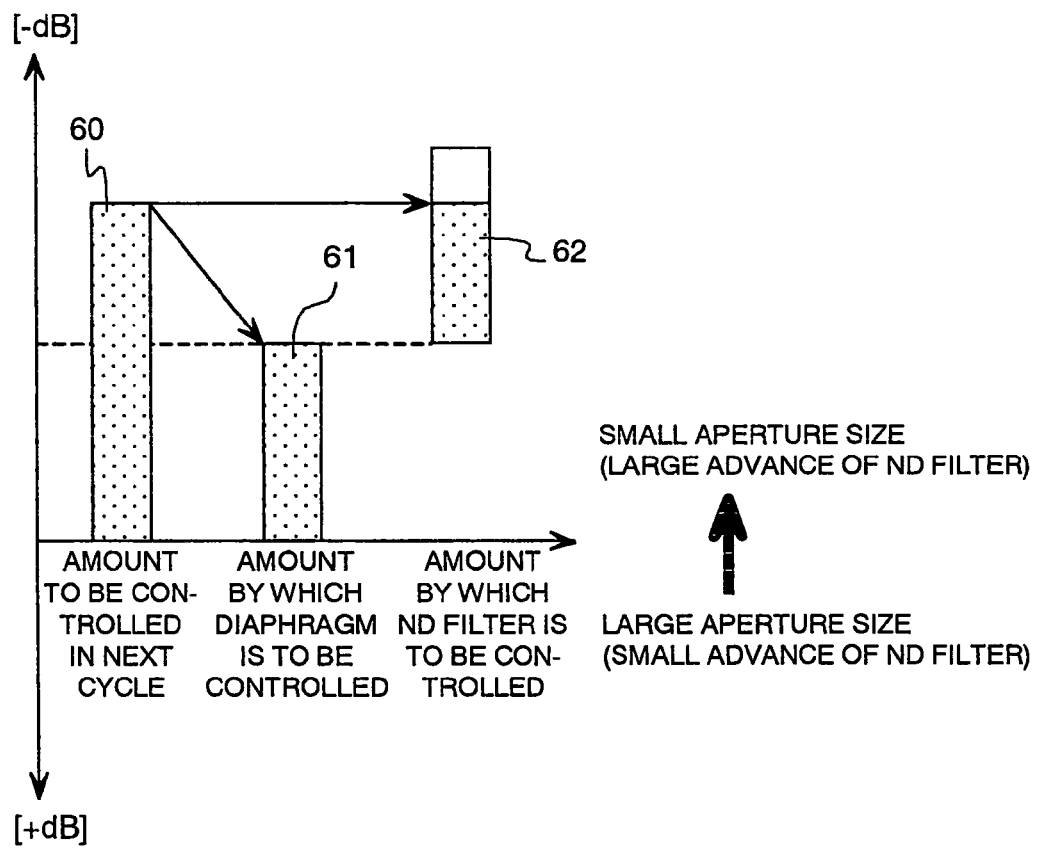
FIG. 8 shows a manner of distributing an amount to be controlled in the next cycle when the amount to be controlled in the next cycle is beyond the control range of the diaphragm.

FIG. 7 shows the distributing manner when the amount 60 to be controlled in the next cycle is within the control range A achievable by the diaphragm blades 2, 3. Since the amount to be controlled is distributed with priority given to the diaphragm blades 2, 3 as indicated by 61, the amount to be controlled by the ND filter 17 is zero. FIG. 8 shows the distributing manner when the amount 60 to be controlled in the next cycle is beyond the control range A achievable by the diaphragm blades 2, 3. The amount 61 to be controlled by the diaphragm blades 2 reaches a maximum value, and a deficiency in comparison with the amount 60 to be controlled in the next cycle is distributed as the amount 62 to be controlled by the ND filter 17.

Figure 9:
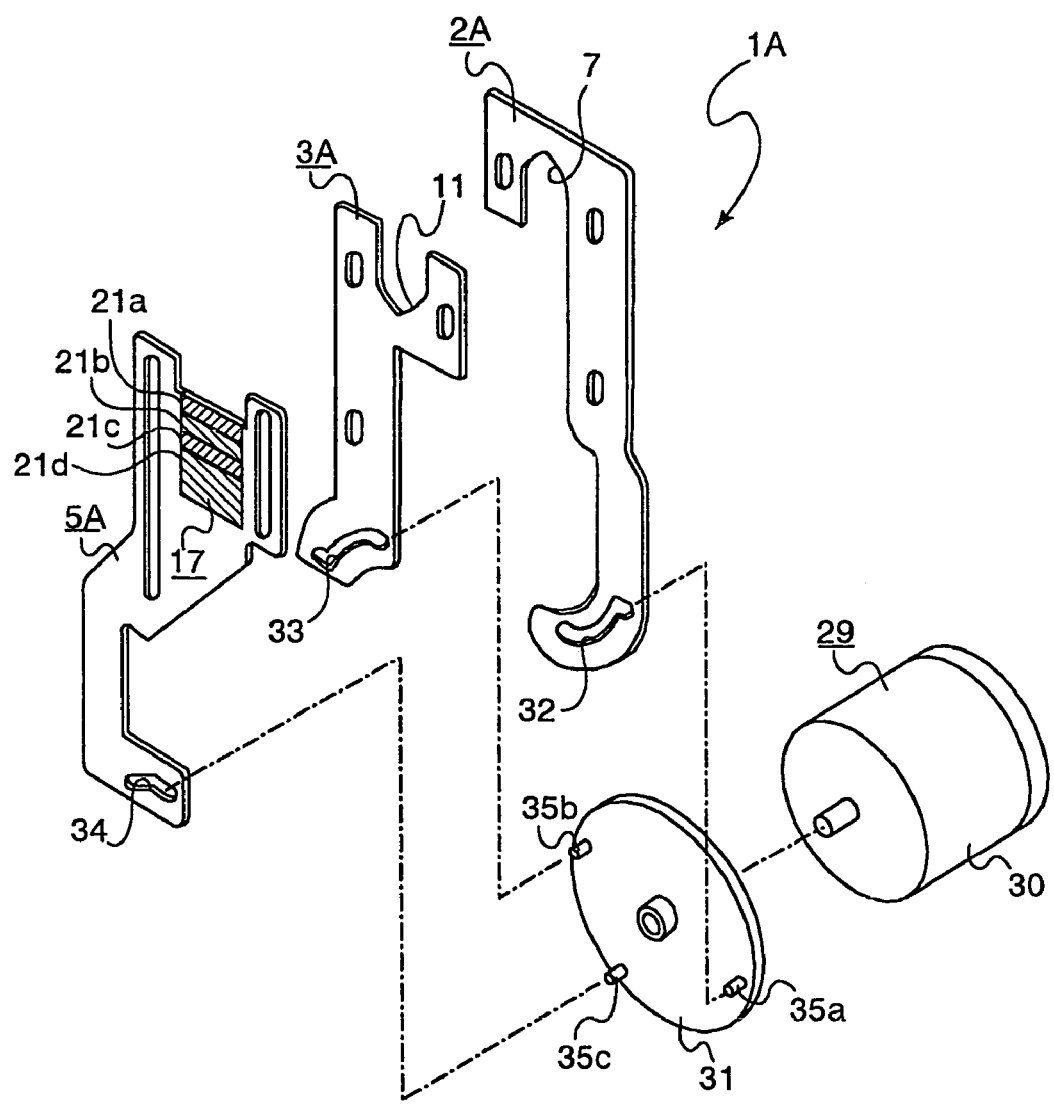
FIG. 9 is an exploded perspective view of an exposure control mechanism, showing a second embodiment of the present invention along with FIGS. 10 and 12.
Figure 10:
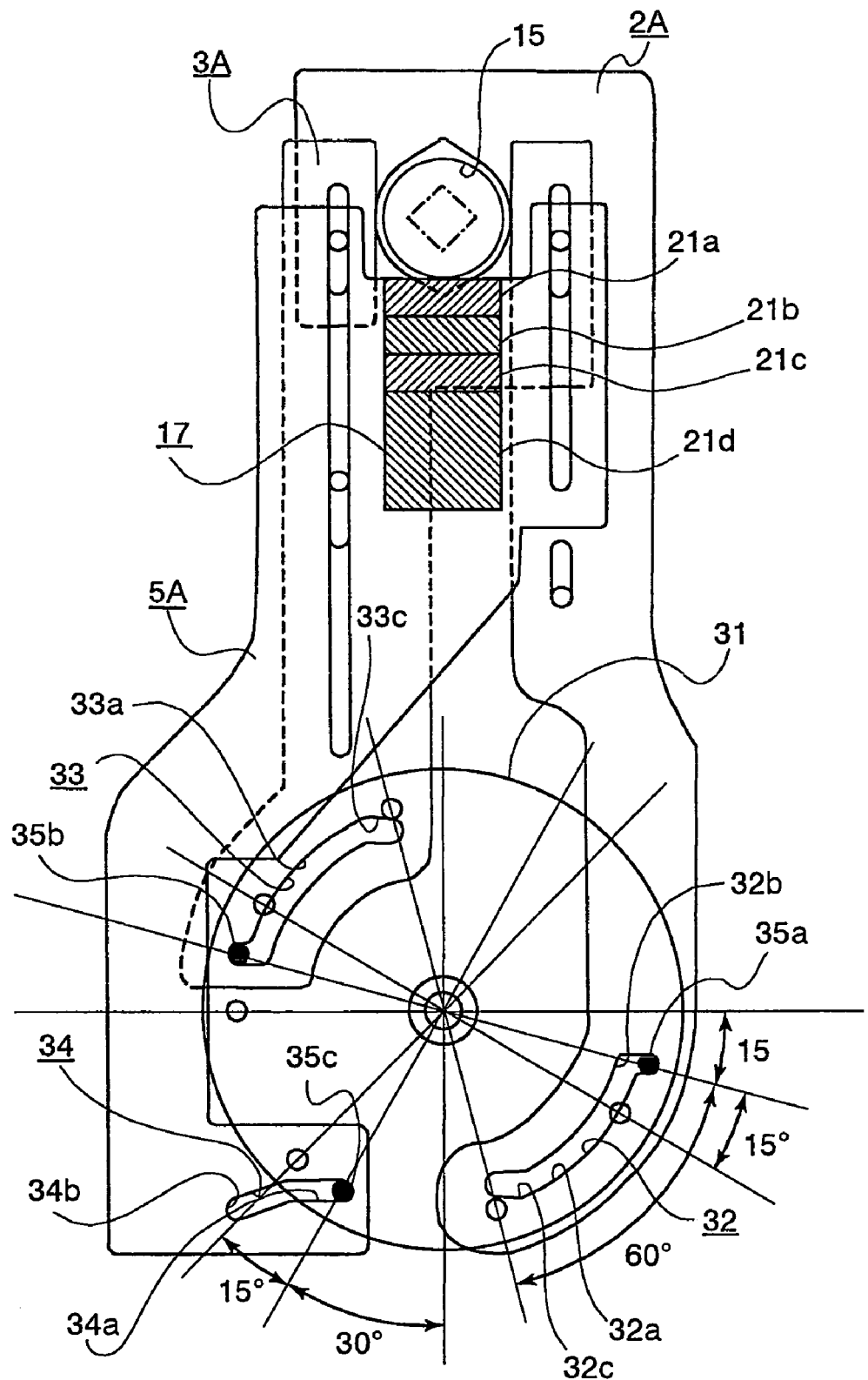
FIG. 10 is a front view of a principal part of the exposure control mechanism shown in FIG. 9.
Figure 11:
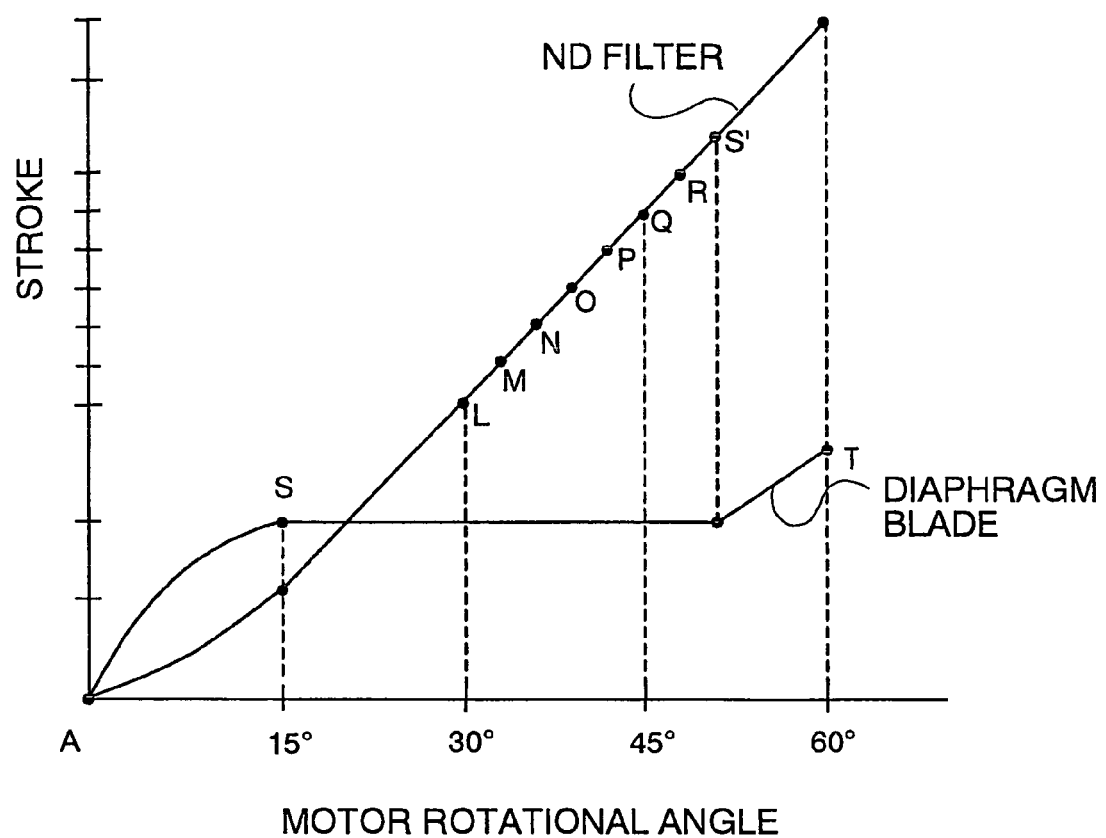
FIG. 11 is a graph showing the relationship between a rotational angle of a rotating plate of the exposure control mechanism shown in FIG. 9 and respective strokes through which each diaphragm blade and an ND filter holding member are moved.

FIGS. 9 to 11 show a second embodiment of the image pickup apparatus of the present invention.

The second embodiment differs from the first embodiment in that two driving mechanisms of the exposure control mechanism, i.e., one for the diaphragm blades 2, 3 (the diaphragm blade driving mechanism 4) and the other for the ND filter holding member 5 (the ND filter driving mechanism 6), are integrated to one driving mechanism. The drawings show only a principal part, and the following description will be made of only the different points between both the embodiments. A description of other parts is omitted here while similar components in the drawings to those of the image pickup apparatus according to the first embodiment are denoted by the same numerals. Also, the size of the diaphragm aperture and the position of the ND filter are changed in a like manner to those in the exposure control mechanism 1 described above in connection with the first embodiment.

A driving mechanism 29 for diaphragm blades 2A, 3A and an ND filter holding member 5A of an exposure control mechanism 1A comprises a motor 30, a rotating plate 31 driven by the motor 30, etc.

Cam grooves 32, 33 are formed respectively in lower end portions of the diaphragm blades 2A, 3A, and a cam groove 34 is formed respectively in a lower end portion of the ND filter holding member 5A.

The rotating plate 31 is substantially in the form of a disc, and has connecting pins 35*a*, 35*b* and 35*c* projecting forward from three predetermined positions on the rotating plate. These connecting pins 35*a*, 35*b* and 35*c* are provided to position on a concentric circle about the center of rotation of the rotating plate 31. The connecting pins 35*a*, 35*b* are disposed at the positions circumferentially spaced through an included angle of 180 degrees about the center of rotation of the rotating plate 31. In a state in which a line interconnecting the two connecting pins 35*a*, 35*b* lies almost horizontally, the connecting pin 35*c* is disposed at the position below the line and slightly nearer to the connecting pin 35*a*.

The connecting pin 35*a* is slidably engaged in the cam groove 32 of the diaphragm blade 2A, the connecting pin 35*b* is slidably engaged in the cam groove 33 of the diaphragm blade 3A, and the connecting pin 35*c* is slidably engaged in the cam groove 33 of the ND filter holding member 5A, respectively.

In a state in which the cam grooves 32, 33 of the diaphragm blades 2A, 3A are engaged respectively with the connecting pins 35*a*, 35*b* of the rotating plate 31, the cam grooves 32, 33 are located in point symmetrical relation about the center of rotation of the rotating plate 31. More specifically, as shown in FIG. 10, portions 32*a*, 33*a* of the cam grooves 32, 33 except for opposite ends thereof are formed into an arc shape about the center of rotation of the rotating plate 31. End portions 32*b*, 33*b* of the cam grooves 32, 33 in a direction opposite to the clockwise direction (hereinafter referred to as "counterclockwise end portions") are formed to displace radially outward as they extend in the counterclockwise direction, and end portions 32*c*, 33*c* of the cam grooves 32, 33 in the clockwise direction (hereinafter referred to as "clockwise end portions") are formed to displace radially inward as they extend in the clockwise direction (see FIG. 10).

The positional relationship between the connecting pins 35*a*, 35*b* and the diaphragm aperture is set such that in a state in which the rotating plate 31 is slightly rotated and the line interconnecting the two connecting pins 35*a*, 35*b* is also slightly rotated in the clockwise direction from the horizontal position (see FIG. 10), the diaphragm aperture 15 is in the open aperture state (see FIG. 2A). In this state, the connecting pins 35*a*, 35*b* are positioned respectively in the counterclockwise end portions 32*b*, 33*b* of the cam grooves 32, 33.

The cam groove 34 of the ND filter holding member 5A is formed into a bow shape being convex upward but relatively flat. When the diaphragm aperture 15 is in the open aperture state, i.e., in the state of FIG. 10, the cam groove 34 is located at a position slightly offset leftward from a lower end of the rotating plate 31. Also, in the state of FIG. 10, the connecting pin 35*c* is positioned at a right end 34*a* of the cam groove 34.

In the above arrangement, when the rotating plate 31 is rotated clockwise in FIG. 10, the diaphragm blade 3A and the ND filter holding member 5A are moved up, whereas the diaphragm blade 2A is moved down, thus narrowing the size of the diaphragm aperture 15.

Then, when the connecting pins 35*a*, 35*b* are engaged respectively in the arc-shaped portions 32*a*, 33*a* of the cam grooves 32, 33, the vertical movements of the diaphragm blades 2A, 3A are stopped. At this time, the diaphragm aperture 15 takes the predetermined aperture size α (see FIG. 2S).

On the other hand, since the cam groove 34 engaging with the connecting pin 35*c* is not arc-shaped, the ND filter holding member 5A continues to move up with the rotation of the rotating plate 31, whereby the ND filter 17 advances into the diaphragm aperture 15 having the predetermined aperture size α. As the ND filter 17 advances into the diaphragm aperture 15 having the predetermined aperture size α, the MTF value is changed in the same manner as in the exposure control mechanism 1 according to the first embodiment (see FIGS. 2S to 3S').

Almost at the same time when the diaphragm aperture 15 having the predetermined aperture size α is entirely covered by the fourth filter element 21d (see FIG. 3S'), the connecting pins 35a, 35b are engaged respectively in the clockwise end portions 32c, 33c of the cam grooves 32, 33. With the further rotation of the rotating plate 31, therefore, the diaphragm blade 3A starts to move up again, whereas the diaphragm blade 2A starts to move down again, thus narrowing the size of the diaphragm aperture 15 covered by the fourth filter element 21d. Finally, when the connecting pins 35a, 35b and 35c are positioned respectively at the clockwise end portions 32c, 33c and a left end 34c of the cam grooves 32, 33 and 34, the motor 30 is stopped and the movements of the diaphragm blades 2A, 3A and the ND filter holding member 5A are also stopped.

FIG. 11 is a graph showing the relationship between a rotational angle of the rotating plate 31 and respective strokes through which the diaphragm blades 2A, 3A and the ND filter holding member 5A are moved.

With the exposure control mechanism 1A, since the cam grooves 32, 33 and 34 are formed respectively in the diaphragm blades 2A, 3A and the ND filter holding member 5A, the two diaphragm blades 2A, 3A and the ND filter holding member 5A can be simultaneously moved by one driving mechanism 29 over the predetermined ranges. Of course, by appropriately changing the shapes of the cam grooves 32, 33 and 34, the movements of the diaphragm blades 2A, 3A and the ND filter holding member 5A can be controlled in a desired manner with ease.

Figure 12:
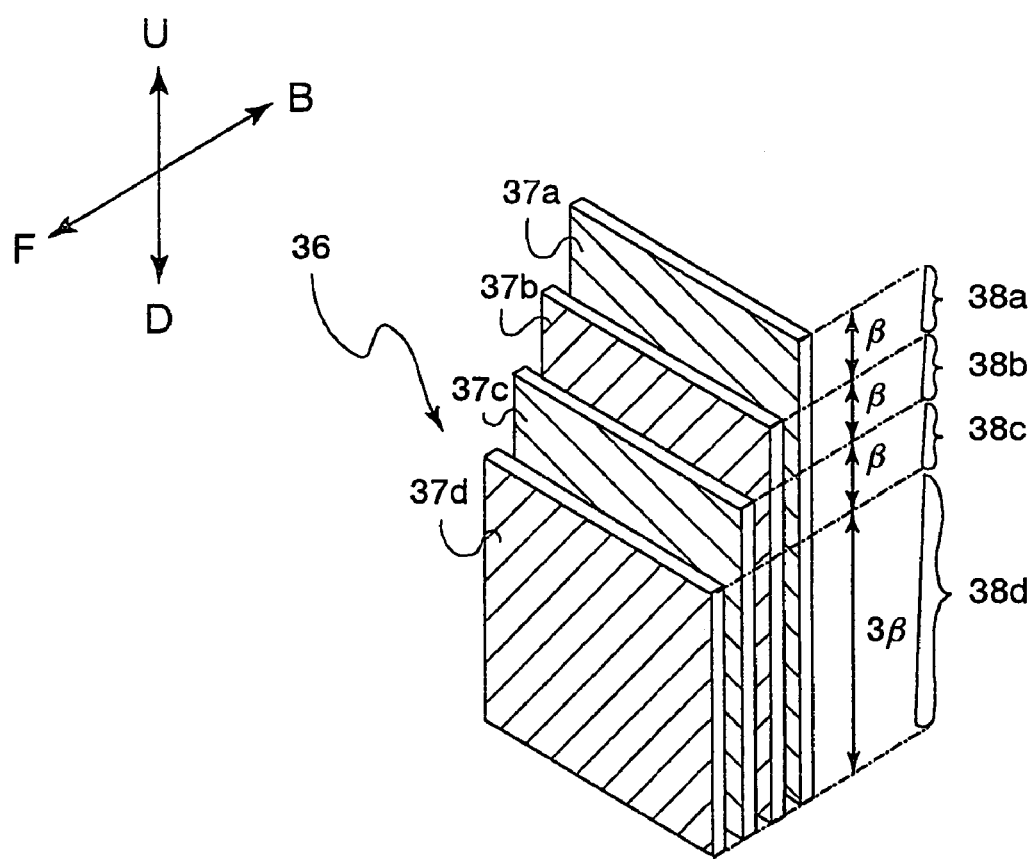
FIG. 12 is an exploded perspective view showing a first modification of the ND filter.

FIG. 12 shows a first modification of the ND filter 17. An ND filter 36 of this modification is formed by placing four filter plates 37a, 37b, 37c and 37d, which have the same transmittance but are different in vertical width, in adjacently overlapped relation in the back-and-forth direction. The backmost filter plate 37a has the largest vertical width, and the vertical widths of the other filter plates are gradually reduced toward the frontmost filter plate 37d. Further, those filter plates 37a, 37b, 37c and 37d are arranged such that their lower edges are flush with one another (see FIG. 12).

The difference in vertical width between the adjacent filter plates 37 is set to β. In other words, a portion 38a of the ND filter 36 formed by the filter plate 37a alone, a portion 38b of the ND filter 36 in which the two filter plates 37a, 37b are overlapped with each other, and a portion 38c of the ND filter 36 in which the three filter plates 37a, 37b and 37c are overlapped with one another, each have a vertical width β. Also, a portion 38d of the ND filter 36 in which the four filter plates 37a, 37b, 37c and 37d are overlapped with one another has a vertical width 3β. Thus the portions 38a, 38b, 38c and 38d have respectively the same dimensions as the filter elements 21a, 21b, 21c and 21d of the ND filter 17 in the exposure control mechanism 1 according to the first embodiment.

The ND filter 36 is made up of the filter plates 37a, 37b, 37c and 37d bonded to each other in close contact fashion. The portion 38a of the ND filter 36 formed by the single filter plate 37a has transmittance of 40%, the portion 38b formed by the two overlapping filter plates 37a, 37b has transmittance of 16% (40%×40%), the portion 38c formed by the three overlapping filter plates 37a, 37b and 37c has transmittance of 6.4% (40%×40%×40%), and the portion 38d formed by the four overlapping filter plates 37a, 37b, 37c and 37d has transmittance of 2.56% (40%×40%×40%×40%). Thus the portions 38a, 38b, 38c and 38d also have respectively almost the same transmittances as the filter elements 21a, 21b, 21c and 21d of the ND filter 17 in the exposure control mechanism 1 according to the first embodiment.

With the ND filter 36 of this modification, an ND filter comparable to the ND filter 17 according to the first embodiment can be formed just by preparing the four filter plates 37 having the same transmittance, and therefore a production cost of the ND filter can be cut down.

Figure 13:
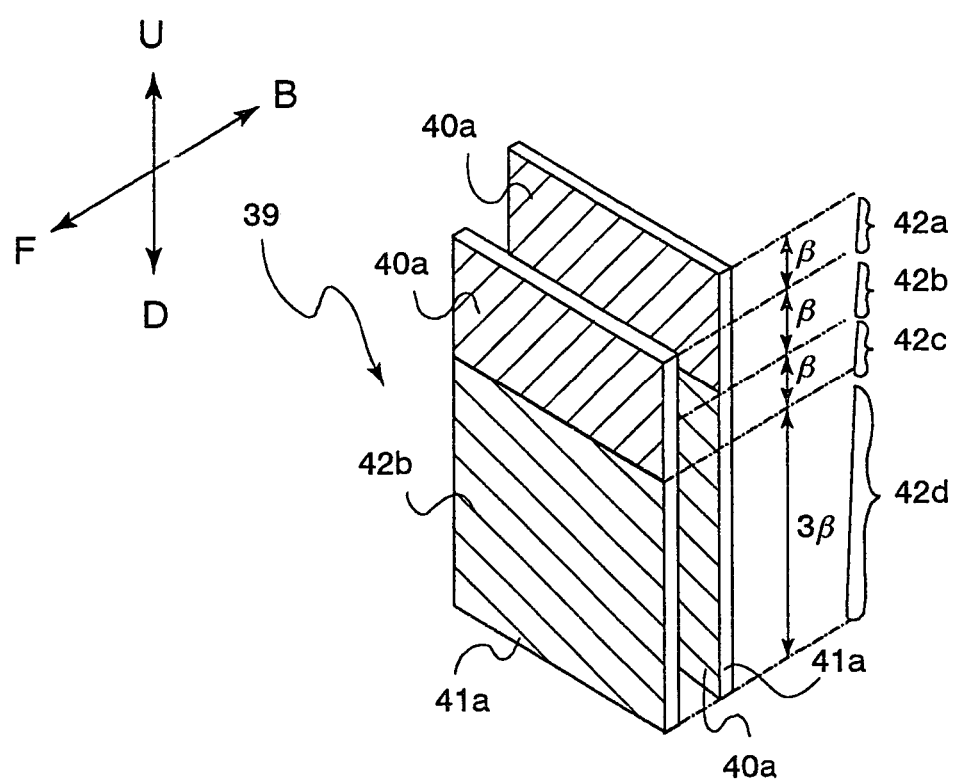
FIG. 13 is an exploded perspective view showing a second modification of the ND filter.
Figure 14:
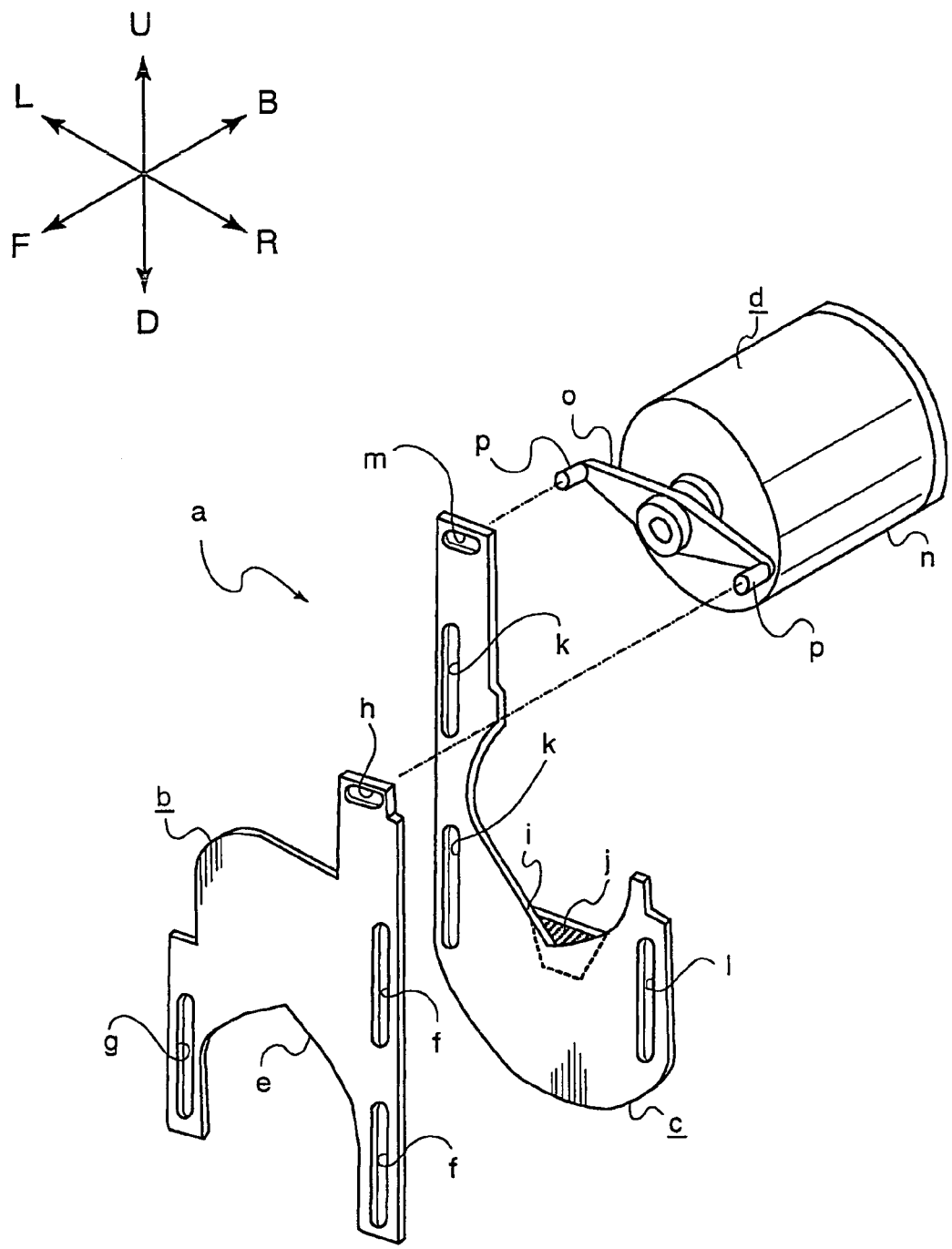
FIG. 14 is an exploded perspective view showing an exposure control mechanism for use in conventional image pickup apparatus along with FIGS. 15 and 16.

FIG. 13 shows a second modification of the ND filter 17. An ND filter 39 of this modification is made up of two filter plates 41 each comprising two filter elements 40a, 40b which have different transmittances. The upper filter element 40a has transmittance of 40%, and the lower filter element 40b has transmittance of 16%.

A front filter plate 41a is formed to have a vertical dimension smaller than that of a rear filter plate 41 by a width β. An upper area of the front filter plate 41a corresponding to a vertical width 2β is formed by the upper filter element 40a, and the remaining lower area of the front filter plate 41a is formed by the lower filter element 40b. Likewise, an upper area of the rear filter plate 41b corresponding to a vertical width 2β is formed by the upper filter element 40a, and the remaining lower area of the rear filter plate 41b is formed by the lower filter element 40b. Those front and rear filter plates 41a, 41b are arranged such that their lower edges are flush with each other (see FIG. 13).

With the above arrangement, a portion 42a of the upper filter element 40a of the rear filter plate 41b which is not overlapped with the front filter plate 41a, a portion 42b in which the upper filter element 40a of the rear filter plate 41b and the upper filter element 40a of the front filter plate 41a are overlapped with each other, and a portion 42c in which the lower filter element 40b of the rear filter plate 41b and the upper filter element 40a of the front filter plate 41a are overlapped with each other, each have a vertical width β. Also, a portion 42d in which the lower filter element 40b of the rear filter plate 41b and the lower filter element 40b of the front filter plate 41a are overlapped with each other has a vertical width 3β. Thus the portions 42a, 42b, 42c and 42d have respectively the same dimensions as the filter elements 21a, 21b, 21c and 21d of the ND filter 17 in the exposure control mechanism 1 according to the first embodiment.

The uppermost portion 42a of the ND filter 39 (i.e., the portion covering the vertical width β from an upper edge) is formed by only the upper filter element 40a of the rear filter plate 41b and has transmittance of 40%. The portion 42b positioned below the uppermost portion 42a and covering the vertical width β is formed by the upper filter element 40a of the rear filter plate 41b and the upper filter element 40a of the front filter plate 41a overlapping with each other, and has transmittance of 16% (40%×40%). The portion 42c positioned below the portion 42b and covering the vertical width β is formed by the lower filter element 40b of the rear filter plate 41b and the upper filter element 40a of the front filter plate 41a overlapping with each other, and has transmittance of 6.4% (16%×40%). The portion 42d positioned below the portion 42c and covering the vertical width 3β is formed by the lower filter element 40b of the rear filter plate 41b and the lower filter element 40b of the front filter plate 41a overlapping with each other, and has transmittance of 2.56% (16%×40%). Thus the portions 42a, 42b, 42c and 42d also have respectively almost the same transmittances as the filter elements 21a, 21b, 21c and 21d of the ND filter 17 in the exposure control mechanism 1 according to the first embodiment.

With the ND filter 39 of this modification, an ND filter comparable to the ND filter 17 according to the first embodiment can be formed just by preparing the two filter plates 41a, 41b each of which is made up of two filter elements 40a, 40b having different transmittances, and therefore a production cost of the ND filter can be cut down. In addition, an optically superior ND filter can be provided without increasing a filter thickness because the thickness of the ND filter 39 is held not so large as that of the ND filter 36 of the above first modification.

In the above-described exposure control mechanism according to each of the above embodiments, the rotating arm(s) is coupled to the diaphragm blades and the ND filter holding member by providing the connecting pins on the side of the rotating arm and forming the connecting slots on the side of the diaphragm blades and the ND filter holding member. However, the image pickup apparatus of the present invention is not limited to the illustrated embodiments. Alternatively, the connecting slots may be formed on the side of the rotating arm, and the connecting pins may be provided on the side of the diaphragm blades and the ND filter holding member.

Also, the driving mechanism(s) for the diaphragm blades and the ND filter holding member is not limited to the use of a motor, but may comprise a rack and pinion unit or a linear motor it should be understood that any shapes and structures of the respective components in each of the above embodiments are illustrated merely by way of examples for implementing the present invention, and the above embodiments are not to be construed in a sense limiting the technical scope of the present invention.

As is apparent from the above description, the present invention provides the following advantages. According to a first aspect, an image pickup apparatus comprises an exposure control mechanism for adjusting the quantity of light flux entering a shooting lens system, the exposure control mechanism comprising a diaphragm made up of diaphragm blades movable on a plane perpendicular to an optical axis in opposite directions to define a diaphragm aperture, and an ND filter made up of at least two ND filter elements having different transmittances, wherein when the diaphragm blades are displaced from an aperture open state in a direction to restrict the quantity of transmitting light, an aperture area is restricted by the diaphragm blades from the open state to a predetermined aperture area, and thereafter the ND filter is advanced into the diaphragm aperture successively from one of the ND filter elements having the highest transmittance while the predetermined aperture area is maintained. Even with an image pickup device having a smaller picture size and a shorter pixel pitch, therefore, it is possible to reduce the effect of diffraction caused by a small aperture and to improve image quality. As a result, an image pickup device having a small picture size and a short pixel pitch can be employed with less deterioration of image quality.

According to a second aspect of the present invention, the light flux entering the shooting lens system is recorded on a recording medium after the quantity of the light flux has been adjusted by the exposure control mechanism. Therefore, a high-quality image can be recorded with less deterioration of image quality.

According to a third aspect of the present invention, the exposure control mechanism includes a first driving mechanism for driving the diaphragm blades and a second driving mechanism for driving the ND filter. Therefore, various control of an optical system can be performed with the diaphragm blades and the ND filter in an independent manner.

According to a fourth aspect of the present invention, the exposure control mechanism includes one driving mechanism and a rotating plate driven by the driving mechanism, which cooperatively perform such an interlock motion that the aperture area is restricted by the diaphragm blades from the open state to the predetermined aperture area, and thereafter the ND filter is advanced into the diaphragm aperture successively from one of the ND filter elements having the highest transmittance while the predetermined aperture area is maintained. Therefore, the two diaphragm blades and the ND filter can be moved by one driving mechanism at the same time over respective predetermined ranges.

According to a fifth aspect of the present invention, the ND filter is formed by placing a plurality of filter plates in adjacently overlapped relation, the filter plates having the same transmittance but being different in size. Therefore, the ND filter can be formed by using the filter plates having the same transmittance, and a production cost of the ND filter can be cut down.

According to a sixth aspect of the present invention, the ND filter is formed by placing a plurality of filter plates in adjacently overlapped relation, each of the filter plates comprising at least two filter elements being different in transmittance and size. It is therefore possible to reduce the number of filter plates used, lessen the thickness of the ND filter, and to cut down a production cost of the ND filter.

According to a seventh aspect of the present invention, the ND filter is advanced into the diaphragm aperture before the diaphragm aperture reaches the predetermined aperture area. Therefore, the so-called dead zone can be produced in which the quantity of light is not changed regardless of driving of the exposure control mechanism. As a result, various control of the optical system in the image pickup apparatus can be performed with ease.

What is claimed is:

1. A method of controlling an exposure control mechanism of an image pickup apparatus, comprising the steps of:
   determining a luminance level of an image signal entering said image pickup apparatus;
   controlling movement of a first diaphragm element, a second diaphragm element and an ND filter unit having a plurality of filter elements, based on the determined luminance level; and
   calculating a total movement amount to be performed in said controlling step,
   wherein said calculating step comprises:
   calculating an error amount based on a predetermined target luminance level and the determined luminance level; and
   calculating the total movement amount based on the error amount and a previous movement amount;
   setting a control range and movement amount of said first and second diaphragms based on the calculated total movement amount; and
   setting a control range and movement amount of said ND filter unit based on the calculated total movement amount and the set movement amount of said first and second diaphragms.

2. A controlling apparatus for an exposure control mechanism of an image pickup apparatus, comprising:
   a camera signal processing unit adapted to determine a luminance level of an image signal entering said image pickup apparatus; and
   a CPU adapted to control movement of a first diaphragm element, a second diaphragm element and an ND filter unit having a plurality of filter elements, based on the determined luminance level, wherein said CPU calculates a total movement amount of said movement by calculating an error amount based on a predetermined target luminance level and the determined luminance level, and by calculating the total movement amount based on the error amount and a previous movement amount, and said CPU sets a control range and movement amount of said first and second diaphragms based on the calculated total movement amount; and sets a control range and movement amount of said ND filter unit based on the total movement amount and the set movement amount of said first and second diaphragms.

3. The controlling apparatus for an exposure control mechanism according to claim 2, wherein said first diaphragm element is positioned on an object side and said ND filter unit is positioned on an image side, said second diaphragm element being between said first diaphragm element and said ND filter unit.

4. The controlling apparatus for an exposure control mechanism according to claim 2, wherein a transmittance for one of said plurality of filter elements differing from a transmittance for another of said plurality of filter elements.

5. The controlling apparatus for an exposure control mechanism according to claim 2, wherein a width for one of said plurality of filter elements is three times that of another of said plurality of filter elements.

* * * * *